United States Patent
Zhu et al.

(10) Patent No.: US 11,249,003 B2
(45) Date of Patent: Feb. 15, 2022

(54) PASSIVE WIRELESS DEVICE FOR MICROFLUIDIC DETECTION OF MULTI-LEVEL DROPLETS

(71) Applicant: Southeast University, Jiangsu (CN)

(72) Inventors: Zhen Zhu, Jiangsu (CN); Mi Wang, Jiangsu (CN); Zhao Zhang, Jiangsu (CN); Qingan Huang, Jiangsu (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 17/270,052

(22) PCT Filed: Apr. 26, 2020

(86) PCT No.: PCT/CN2020/086955
§ 371 (c)(1),
(2) Date: Feb. 22, 2021

(87) PCT Pub. No.: WO2021/169021
PCT Pub. Date: Sep. 2, 2021

(65) Prior Publication Data
US 2022/0011214 A1 Jan. 13, 2022

(30) Foreign Application Priority Data
Feb. 24, 2020 (CN) .......................... 202010113345.3

(51) Int. Cl.
*G01N 15/10* (2006.01)

(52) U.S. Cl.
CPC ..... *G01N 15/1031* (2013.01); *G01N 15/1056* (2013.01); *G01N 2015/1087* (2013.01)

(58) Field of Classification Search
CPC ............ G01N 15/103; G01N 15/1056; G01N 2015/1087
See application file for complete search history.

(56) References Cited

U.S. PATENT DOCUMENTS

| 2010/0204459 A1* | 8/2010 | Mason | ................. B01J 13/0004 530/408 |
| 2014/0070911 A1* | 3/2014 | Rofougaran | ............ H01F 21/06 336/30 |

(Continued)

FOREIGN PATENT DOCUMENTS

| CN | 102650512 | 8/2012 |
| CN | 104266680 | 1/2015 |

(Continued)

OTHER PUBLICATIONS

"International Search Report (Form PCT/ISA/210) of PCT/CN2020/086955," dated Oct. 29, 2020, pp. 1-5.

*Primary Examiner* — Dominic E Hawkins
(74) *Attorney, Agent, or Firm* — JCIP Global Inc.

(57) ABSTRACT

Disclosed is a passive wireless device for microfluidic detection of multi-level droplets. A primary inductor channel and a secondary inductor channel each comprise two layers of inductance coils, and the inductance coils of the primary inductor channel and the secondary inductor channel are alternately arranged in each layer. A double-resonance circuit is formed after a liquid conductive material is injected. A first part of a detection channel is disposed between a primary capacitor channel, and a second part of a detection channel is disposed between a secondary capacitor channel. A reading device is used to read a resonant frequency of the double-resonance circuit, and perform detection according to the resonant frequency to obtain information of a corresponding first droplet group and/or second droplet group.

11 Claims, 6 Drawing Sheets

(56) References Cited

U.S. PATENT DOCUMENTS

2016/0025535 A1\* 1/2016 Byers .................... G01F 1/7088
                                                    73/861.08
2018/0116142 A1\* 5/2018 Martinant .......... C12N 15/8287
2018/0143123 A1\* 5/2018 Hanay ................ G01N 15/1031

FOREIGN PATENT DOCUMENTS

| CN | 106885762 | 6/2017 |
| CN | 108008032 | 5/2018 |
| CN | 108844936 | 11/2018 |
| WO | 2020031089 | 2/2020 |

\* cited by examiner

PASSIVE WIRELESS DEVICE FOR MICROFLUIDIC DETECTION OF MULTI-LEVEL DROPLETS

CROSS-REFERENCE TO RELATED APPLICATION

This application is a 371 of international application of PCT application serial no. PCT/CN2020/086955, filed on Apr. 26, 2020, which claims the priority benefit of China application no. 202010113345.3, filed on Feb. 24, 2020. The entirety of each of the above mentioned patent applications is hereby incorporated by reference herein and made a part of this specification.

BACKGROUND

Technical Field

The present invention relates to droplet detection, and in particular, to a passive wireless device for microfluidic detection of multi-level droplets.

Description of Related Art

As the application of micro-droplets becomes increasingly important at present, droplet, bubble, and particle detection has gradually attracted attention. The droplet detection is widely applied in droplet emulsification, mixing, embedding, extraction, biological identification, and the like. However, there still lacks a solution to rapid and accurate detection of parameters such as a droplet speed, flow rate, size, and quantity before and after a control.

Droplet detection solutions used in the prior art include an acoustic detection method, an optical detection method, an inductance detection method, and a capacitance detection method. The acoustic detection method is susceptible to conditions such as noise and vibration; and the optical detection method is susceptible to environmental factors such as temperature and oil permeability. Requiring an external power source to supply power to the circuit and leads for connection, the inductance detection method and the capacitance detection method are limited in application due to the two factors. In addition, a detection solution of multi-level droplets realizes measurement of multiple parameters. Because a detection result already has a deviation after a single execution, such a detection solution avoids an increase in the deviation of the detection result as compared with a solution in which detection is repeated twice in the prior art.

SUMMARY

Invention objective: The present invention aims to provide a passive wireless device for microfluidic detection of multi-level droplets.

Technical solution: An embodiment of the present invention provides a passive wireless device for microfluidic detection of multi-level droplets, which includes: a detection channel, a first droplet generation structure, a second droplet generation structure, a primary capacitor channel, a secondary capacitor channel, a primary inductor channel, a secondary inductor channel, and a reading device, where the first droplet generation structure is connected to the detection channel and used to generate a first droplet group;

the second droplet generation structure is connected to the detection channel, and used to embed the first droplet group to generate a second droplet group;

the primary inductor channel and the secondary inductor channel each include two layers of inductance coils, and the inductance coils of the primary inductor channel and the secondary inductor channel are alternately arranged in each layer;

the primary capacitor channel is connected to the primary inductor channel, the secondary capacitor channel is connected to the secondary inductor channel, and the primary inductor channel is connected to the secondary inductor channel; a liquid conductive material is injected into the primary capacitor channel, the primary inductor channel, the secondary capacitor channel, and the secondary inductor channel, to form a double-resonance circuit;

a first part of the detection channel is disposed between the primary capacitor channel, where when a first droplet group passes through the first part, the permittivity of the primary capacitor channel changes and consequently a capacitance value of the primary capacitor channel changes, resulting in a change in a first resonant frequency of the double-resonance circuit; and a second part of the detection channel is disposed between the secondary capacitor channel, where when a second droplet group passes through the second part, the permittivity of the secondary capacitor channel changes and consequently a capacitance value of the secondary capacitor channel changes, resulting in a change in a second resonant frequency of the double-resonance circuit; and the reading device is used to read the resonant frequency of the double-resonance circuit, and perform detection according to the resonant frequency to obtain information of the corresponding first droplet group and/or second droplet group.

Specifically, the device further includes a microfluidic chip substrate, where the detection channel, the first droplet generation structure, the second droplet generation structure, the primary capacitor channel, the secondary capacitor channel, the primary inductor channel, and the secondary inductor channel are formed by micro channels based on a polydimethylsiloxane (PDMS) material, and are integrated on the microfluidic chip substrate.

Specifically, the first droplet generation structure includes a first fluid inlet, a second fluid inlet, and a third fluid inlet; a first liquid and a second liquid are injected through the first fluid inlet and the second fluid inlet respectively, and a continuous-phase liquid is injected through the third fluid inlet.

Specifically, the second droplet generation structure includes a fourth fluid inlet through which an embedding liquid is injected to embed the first liquid and the second liquid, so as to form the second droplet group.

Specifically, the detection channel includes a bent part which is disposed between the first part and the second part and is used to enable the first droplet group embedded in the second droplet group to blend.

Specifically, the reading device calculates the volume of the first droplet group or the second droplet group by using the following formula when the first droplet group or the second droplet group contacts the inner wall of the detection channel:

$$\Delta f_s = K_1 \cdot K_2 \cdot V_{droplet},$$

where $\Delta f_s$ denotes a variation value of the first resonant frequency or the second resonant frequency;

$$K_1 = \frac{L_s}{4\pi(L_s C_s)^{\frac{3}{2}}},$$

$L_s$ being an inductance value of the primary inductor channel or the secondary inductor channel and $C_s$ being a capacitance value of the primary capacitor channel or the secondary capacitor channel; and $$K_2 = A \cdot \frac{\varepsilon_0(\varepsilon_1 - \varepsilon_2)}{D \cdot V_{capacitor}},$$

where A and D respectively denote a facing area and a distance between the primary capacitor channel or between the secondary capacitor channel; $V_{capacitor}$ denotes a volume contained between the primary capacitor channel or between the secondary capacitor channel; $\varepsilon_1$ and $\varepsilon_2$ respectively denote a relative permittivity of the first droplet group between the primary capacitor channel or the second droplet group between the secondary capacitor channel, and a relative permittivity of a substance other than the droplet; and $\varepsilon_0$ denotes the vacuum permittivity.

Specifically, the reading device calculates the length of the first droplet group or the second droplet group with reference to the size of the detection channel.

Specifically, the reading device calculates the volume of the first droplet group or the second droplet group by using the following formula when the first droplet group or the second droplet group does not contact the inner wall of the detection channel:

$$\Delta f_s = K_1 \cdot \frac{4\pi \cdot (\varepsilon_1 - \varepsilon_2) \cdot \varepsilon_0 \varepsilon_2}{D \cdot \varepsilon_1} \cdot \frac{r^3}{3D + 4r\left(\frac{\varepsilon_2}{\varepsilon_1} - 1\right)},$$

where $\Delta f_s$ denotes a variation value of the first resonant frequency or the second resonant frequency;

$$K_1 = \frac{L_s}{4\pi(L_s C_s)^{\frac{3}{2}}},$$

$L_s$ being an inductance value of the primary inductor channel or the secondary inductor channel and $C_s$ being a capacitance value of the primary capacitor channel or the secondary capacitor channel; and D denotes a distance between the primary capacitor channel or between the secondary capacitor channel; $\varepsilon_1$ and $\varepsilon_2$ respectively denote a relative permittivity of the first droplet group between the primary capacitor channel or the second droplet group between the secondary capacitor channel, and a relative permittivity of a substance other than the droplet; $\varepsilon_0$ denotes the vacuum permittivity; r denotes the radius of the first droplet group or the second droplet group; 2r denotes the length of the first droplet group or the second droplet group, and $4/3 \cdot \pi r^3$ is the volume of the first droplet group or the second droplet group.

Specifically, the reading device calculates the speed $S_{droplet}$ of the first droplet group or the second droplet group by using the following formula:

$$S_{droplet} = \frac{L_{capacitor} + l_{droplet}}{\Delta t},$$

where $L_{capacitor}$ denotes the length of the primary capacitor channel or the secondary capacitor channel, $l_{droplet}$ denotes the length of the first droplet group or the second droplet group, and $\Delta t$ denotes the time for which the first droplet group passes between the primary capacitor channel or the second droplet group passes between the secondary capacitor channel.

Specifically, the reading device calculates the number of the first droplet groups or the second droplet groups according to the number of changes in the first resonant frequency or the second resonant frequency.

Advantageous Effect: Compared to the prior art, the present invention has the following significant advantages. A first resonant frequency and a second resonant frequency of a passive circuit can be read from a single detection in a non-contact mode and detection of multi-level droplets can be realized according to the resonant frequency, thus getting rid of external and internal limitations, greatly reducing the size of a detection device, causing no loss to the device, prolonging the service life of the device, ensuring the accuracy of a detection result on the whole, and expanding the applications of the detection device.

DESCRIPTION OF THE EMBODIMENTS

The technical solution of the present invention is further described below with reference to the accompanying drawings.

Figure 1:
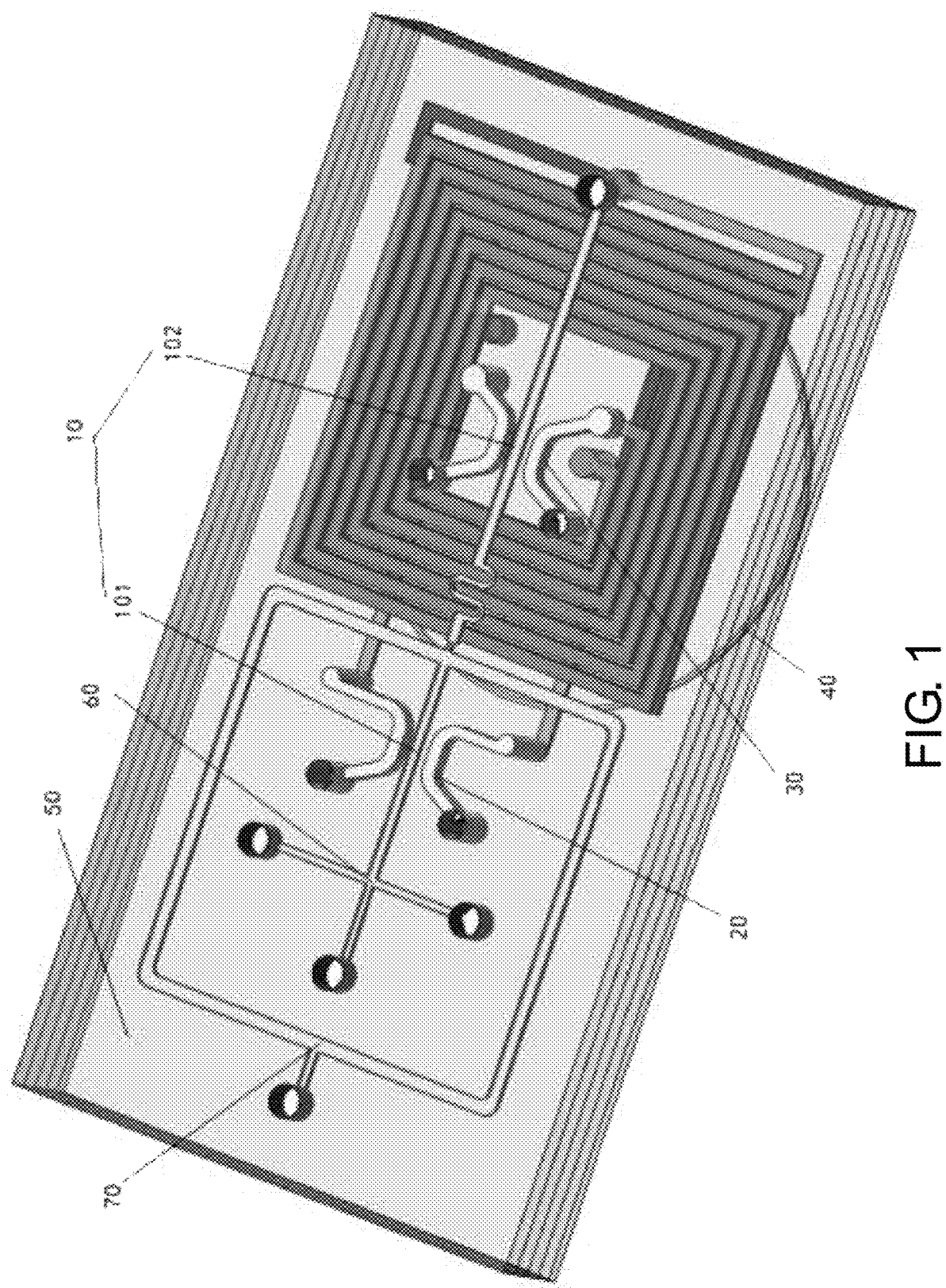
FIG. 1 is a schematic structural diagram of a passive wireless device for microfluidic detection of multi-level droplets provided in an embodiment of the present invention.

Referring to FIG. 1, FIG. 1 is a schematic structural diagram of a passive wireless device for microfluidic detection of multi-level droplets provided in an embodiment of the present invention, which is described in detail below with reference to the accompanying drawings and specific embodiments.

The embodiment of the present invention provides a passive wireless device for microfluidic detection of multi-level droplets, which includes a detection channel 10, a first droplet generation structure 60, a second droplet generation structure 70, a primary capacitor channel 20, a secondary capacitor channel 30, a primary inductor channel 80, a secondary inductor channel 90, and a reading device 40.

The first droplet generation structure 60 is connected to the detection channel 10 and used to generate a first droplet group.

The second droplet generation structure 70 is connected to the detection channel 10, and used to embed the first droplet group to generate a second droplet group.

The primary inductor channel 80 and the secondary inductor channel 90 each include two layers of inductance coils, and the inductance coils of the primary inductor channel 80 and the secondary inductor channel 90 are alternately arranged in each layer.

The primary capacitor channel 20 is connected to the primary inductor channel 80, the secondary capacitor channel 30 is connected to the secondary inductor channel 90, and the primary inductor channel 80 is connected to the secondary inductor channel 90. A liquid conductive material is injected into the primary capacitor channel 20, the primary inductor channel 80, the secondary capacitor channel 30, and the secondary inductor channel 90, to form a double-resonance circuit.

A first part 101 of the detection channel 10 is disposed between the primary capacitor channel 20, where when a first droplet group passes through the first part 101, the permittivity of the primary capacitor channel 20 changes and consequently a capacitance value of the primary capacitor channel 20 changes, resulting in a change in a first resonant frequency of the double-resonance circuit. A second part 102 of the detection channel 10 is disposed between the secondary capacitor channel 30, where when a second droplet group passes through the second part 102, the permittivity of the secondary capacitor channel 30 changes and consequently a capacitance value of the secondary capacitor channel 30 changes, resulting in a change in a second resonant frequency of the double-resonance circuit.

The reading device 40 is used to read the resonant frequency of the double-resonance circuit, and perform detection according to the resonant frequency to obtain information of the corresponding first droplet group and/or second droplet group.

In a specific implementation, the primary capacitor channel 20 and the secondary capacitor channel 30 each include two capacitor plates (or referred to as capacitor plate channels); and "between the primary capacitor channel 20" means "between the two capacitor plates of the primary capacitor channel 20" and "between the secondary capacitor channel 30" means "between the two capacitor plates of the secondary capacitor channel 30".

In a specific implementation, the first droplet generation structure 60 can generate the first droplet group which can pass through the first part 101 of the detection channel 10, and then detection is performed to obtain information of the first droplet group. Afterwards, the process involves the second droplet generation structure 70. The detected first droplet group is embedded under the effect of the second droplet generation structure 70 to form the second droplet group, and then the second droplet group passes through the second part 102 of the detection channel 10; and detection is performed to obtain information of the second droplet group.

In a specific implementation, the first droplet group generated by the first droplet generation structure 60 may be composed of a single type of dispersed phase (which may be regarded as a detected object) and continuous phase (which may be regarded as a filling substance in the detection channel 10), or may consist of multiple types of dispersed and continuous phases.

In the embodiment of the present invention, the first droplet generation structure 60 includes a first fluid inlet 601, a second fluid inlet 602, and a third fluid inlet 603, where a first liquid and a second liquid are injected through the first fluid inlet 601 and the second fluid inlet 602 respectively, and a continuous-phase liquid is injected through the third fluid inlet 603.

In the embodiment of the present invention, the second droplet generation structure 70 includes a fourth fluid inlet 701 through which an embedding liquid is injected to embed the first liquid and the second liquid, so as to form the second droplet group.

Figure 2:
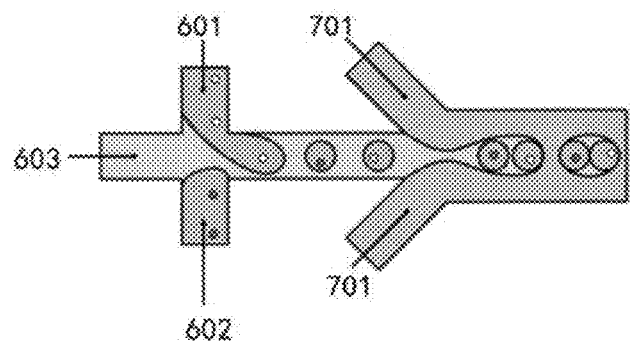
FIG. 2 is a schematic diagram of a first droplet group and a second droplet group provided in an embodiment of the present invention.

Refer to FIG. 2, which is a schematic diagram of the first droplet group and the second droplet group provided in an embodiment of the present invention.

In a specific implementation, the first liquid is injected through the first fluid inlet 601 and the second liquid is injected through the second fluid inlet 602, where the first liquid and the second liquid are mutually miscible but are neither miscible with the continuous-phase liquid. After the first liquid and the second liquid are injected, a drop of the first liquid and a drop of the second liquid which are spaced apart are formed, and may be together regarded as the first droplet group.

In a specific implementation, the embedding liquid is injected through the fourth fluid inlet 701 of the second droplet generation structure 70, and is immiscible with the first liquid, the second liquid, and the continuous-phase liquid. After passing through the first part 101 of the detection channel 10, the first droplet group meets the embedding liquid, and the embedding liquid can embed the drop of the first liquid and the drop of the second liquid, to form the second droplet group which then enters the second part 102 of the detection channel 10.

In a specific implementation, a droplet size and generation frequency can be flexibly adjusted by adjusting conditions, such as the structural design, geometric dimensions, surface chemical properties, and fluid flow rate, of the droplet generation structure. The droplet generation structure may be self-set by the user mainly to the following three structural modes: T-junction, flow-focusing, and co-axial flow.

Figure 3:
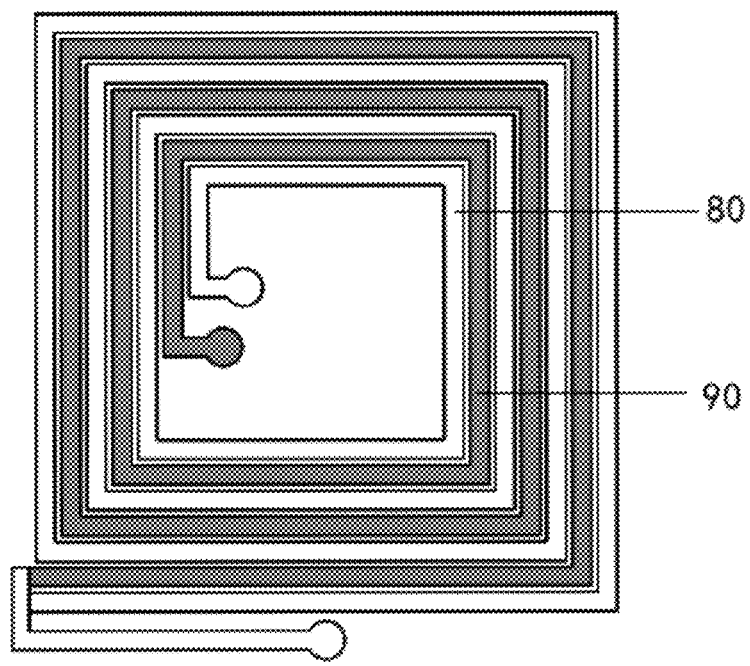
FIG. 3 is a schematic diagram of a single-layer inductor channel provided in an embodiment of the present invention.
Figure 4:
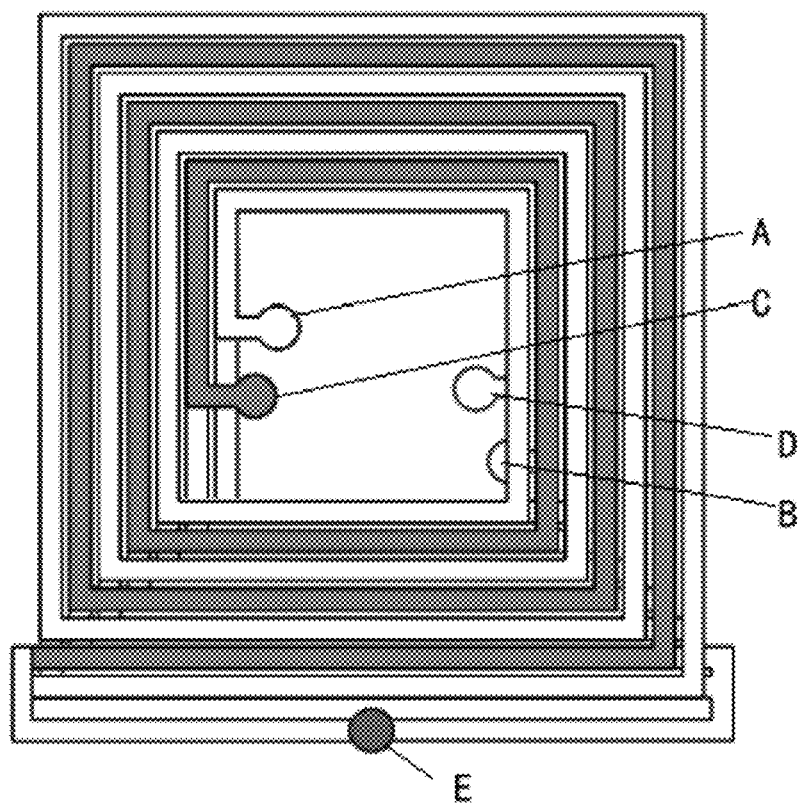
FIG. 4 is a top view of inductor channels (a primary inductor channel and a secondary inductor channel) arranged in upper and lower layers in an embodiment of the present invention.
Figure 5:
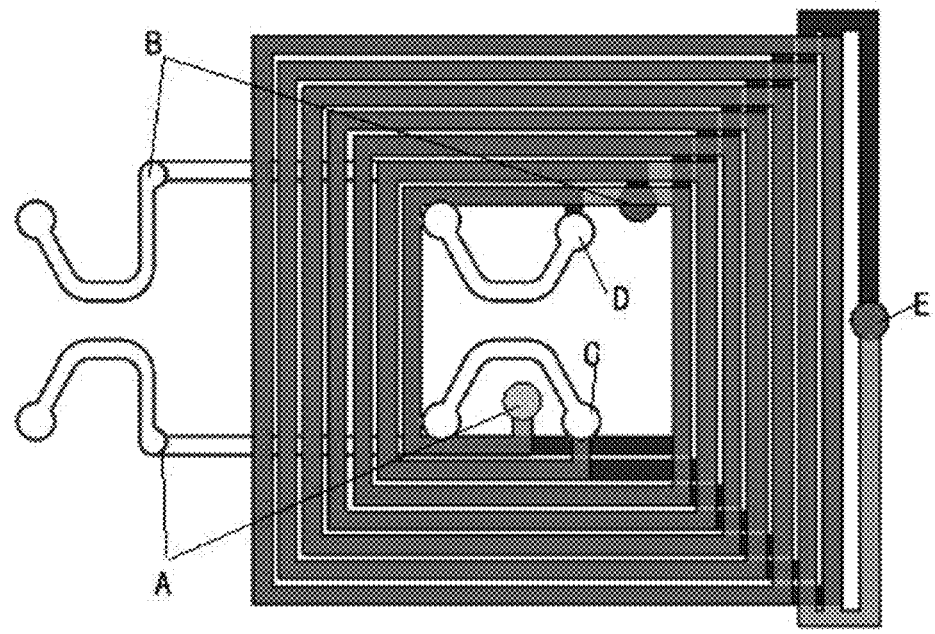
FIG. 5 is a top view of the passive wireless device for microfluidic detection of multi-level droplets provided in an embodiment of the present invention.

Referring to FIGS. 3, 4, and 5, FIG. 3 is a schematic diagram of a single-layer inductor channel provided in an embodiment of the present invention, FIG. 4 is a top view of the primary inductor channel 80 and the secondary inductor channel 90 provided in an embodiment of the present invention, and FIG. 5 is a top view of the passive wireless device for microfluidic detection of multi-level droplets provided in an embodiment of the present invention.

In a specific implementation, in one inductance coil layer, the primary inductor channel 80 and the secondary inductor channel 90 are alternately arranged in a manner shown in FIG. 3, but the present invention is not limited to the alternate arrangement of one primary inductor channel 80 and one secondary inductor channel 90 shown in FIG. 3. Alternatively, two primary inductor channels 80 and one secondary inductor channel 90 may be alternately arranged, or two primary inductor channels 80 and two secondary inductor channels 90 may be alternately arranged, which may be specifically set by the user according to actual applications. The other inductance coil layer may have the same layout as the single-layer inductance coil shown in FIG. 3 and is arranged in symmetry, to form two layers of inductance coils shown in FIG. 4. The number of layers of the inductance coils includes, but is not limited to, two, three, four, or the like, which may be specifically set by the user according to actual applications.

In a specific implementation, a connection relationship between the primary capacitor channel 20, the secondary capacitor channel 30, the primary inductor channel 80, and the secondary inductor channel 90 may be shown in FIG. 5, where one capacitor plate of the primary capacitor channel 20 and the primary inductor channel 80 are connected at a point A, and the other capacitor plate thereof and the primary inductor channel 80 are connected at a point B. One capacitor plate of the secondary capacitor channel 30 and the secondary inductor channel 90 are connected at a point C, and the other capacitor plate thereof and the secondary inductor channel 90 are connected at a point D. The primary inductor channel 80 and the secondary inductor channel 90 are connected at a point E.

In a specific implementation, after the liquid conductive material is injected, a passive double-resonance circuit can be formed, where the liquid conductive material may be liquid gallium-indium-tin alloy, conductive silver paste, PEDOT:PSS solution, or the like. Compared to the capacitance detection method and the inductance detection method which require an external power source to supply power to the circuit and leads for connection in the prior art, the passive wireless resonant circuit can get rid of the limitations from the external power source and the leads, greatly reducing the device size. Therefore, the present invention can be applied in a closed or harsh environment, such as a closed mechanical structure or a rotating mechanical structure; and further is insusceptible to the external power source, thus improving the accuracy of a detection result.

Figure 6:
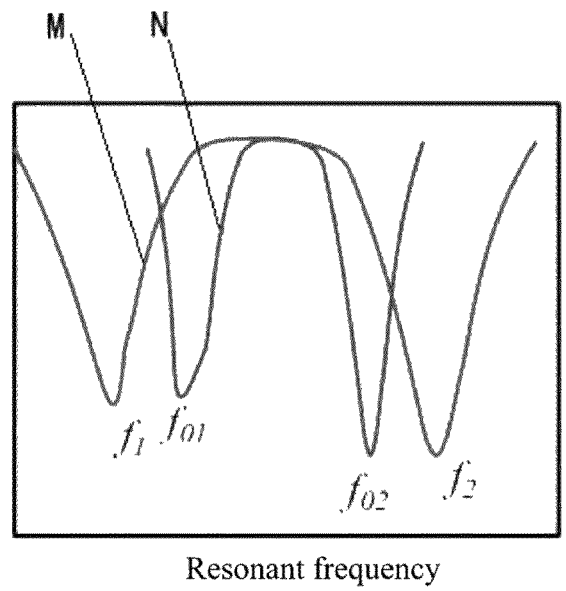
FIG. 6 is a schematic curve chart of a resonant frequency of a double-resonance circuit provided in an embodiment of the present invention.

Referring to FIG. 6, FIG. 6 is a schematic curve chart of a resonant frequency of a double-resonance circuit provided in an embodiment of the present invention.

In a specific implementation, the double-resonance circuit may be formed by means of connection between the primary capacitor channel 20, the primary inductor channel 80, the secondary capacitor channel 30, and the secondary inductor channel 90 and their arrangement manners; and resonant frequency curves corresponding to the circuit is shown in FIG. 6, where curves M and N are respectively resonant frequency curves of capacitance values of the primary capacitor channel 20 and the secondary capacitor channel 30 before and after a change. The former halves of the curves M and N are corresponding to a first resonant frequency and reflect a status of the first droplet group, where $f_1$ denotes a minimum point of the resonant frequency before the capacitance value of the primary capacitor channel 20 changes (when the first droplet group has not passed through the first part 101 of the detection channel 10), and $f_{01}$ denotes a minimum point of the resonant frequency after the capacitance value of the primary capacitor channel 20 changes (after the first droplet group passes through the first part 101 of the detection channel 10). The latter halves of the curves M and N are corresponding to a second resonant frequency and reflect a status of the second droplet group, where $f_2$ denotes a minimum point of the resonant frequency before the capacitance value of the secondary capacitor channel 30 changes (when the second droplet group has not passed through the second part 102 of the detection channel 10), and $f_{02}$ denotes a minimum point of the resonant frequency after the capacitance value of the secondary capacitor channel 30 changes (after the second droplet passes through the second part 102 of the detection channel 10). Detection may be performed according to the first resonant frequency and the change in the first resonant frequency to obtain information of the first droplet group, and detection may be performed according to the second resonant frequency and the change in the second resonant frequency to obtain information of the second droplet group.

In a specific implementation, the double-resonance circuit may simultaneously show information and statuses of multi-level droplets by using corresponding resonant frequency curves, without the need to repeat detection for many times before realizing detection of the multi-level droplets in the prior art. Therefore, the present invention can minimize the errors and ensure the accuracy of a detection result.

In a specific implementation, the inductance coil is a spiral channel which spirals in various plane shapes such as a square, rectangle, ellipse, circle, etc., so as to form the inductance coil. For example, as shown in FIGS. 3, 4 and 5, the inductance coil is in a square shape. The two capacitor plates of the primary capacitor channel 20 and the two capacitor plates of the secondary capacitor channel 30 all have an opening for the liquid conductive material to inject or flow out.

In a specific implementation, compared to the acoustic detection method and the optical detection method which are susceptible to external factors and require performing operations such as marking and heating on the detection object in the prior art, the present invention uses the droplet to pass between the capacitor channel to change the permittivity of the capacitor channel and then performs detection according to the resonant frequency of the resonant circuit, eliminating interference from the external factors and not requiring additional processing for the detection object. Therefore, the present invention can ensure the accuracy of the detection result, realize loss-free and highly repeatable detection, and further prolong the service life of the detection device.

In a specific implementation, the reading device 40 may be formed by a readout coil and a vector network analyzer, or a readout coil and an impedance spectroscope, or another device capable of reading the resonant frequency. The reading device 40 reads the resonant frequency and a variation value of the resonant frequency in a non-contact mode, and eliminates the interference from the external factors or the limitations of a connection line with the resonant circuit, thus realizing loss-free and highly repeatable detection, prolonging the service life of the passive wireless detection device, expanding the applications of the passive wireless detection device, and ensuring the accuracy of the detection result.

In a specific implementation, the reading device 40 may further include a part for calculation and detection, which is used for data calculation to obtain the detection result.

In the embodiment of the present invention, the passive wireless device for microfluidic detection of multi-level droplets further includes a microfluidic chip substrate 50, where the detection channel 10, the first droplet generation structure 60, the second droplet generation structure 70, the primary capacitor channel 20, the secondary capacitor channel 30, the primary inductor channel 80, and the secondary inductor channel 90 are formed by micro channels based on a PDMS material, and are integrated on the microfluidic chip substrate 50.

In a specific implementation, the PDMS material belongs to organosilicon and can be used for manufacturing of microfluidic chips; and the micro channel may refer to a channel.

In a specific implementation, the passive resonant circuit is formed by injecting the liquid conductive material into the channels, thus eliminating the limitations from the external power source and connection lines, and greatly reducing the size of the whole detection device. Therefore, the channels can be integrated on the microfluidic chip substrate 50 to form a microfluidic chip for detection of multi-level droplets, improving portability.

In the embodiment of the present invention, the detection channel 10 includes a bent part which is disposed between the first part 101 and the second part 102 and used to enable the first droplet group embedded in the second droplet group to blend.

In a specific implementation, in order to obtain a high-quality and accurate detection result, the bent part is arranged after a part in which the second droplet generation structure 70 acts on the first droplet group. When the second droplet group passes through the bent part, the flow slows down, thus making the first liquid and the second liquid embedded in the second droplet group blend to be fully miscible with each other.

Figure 7:
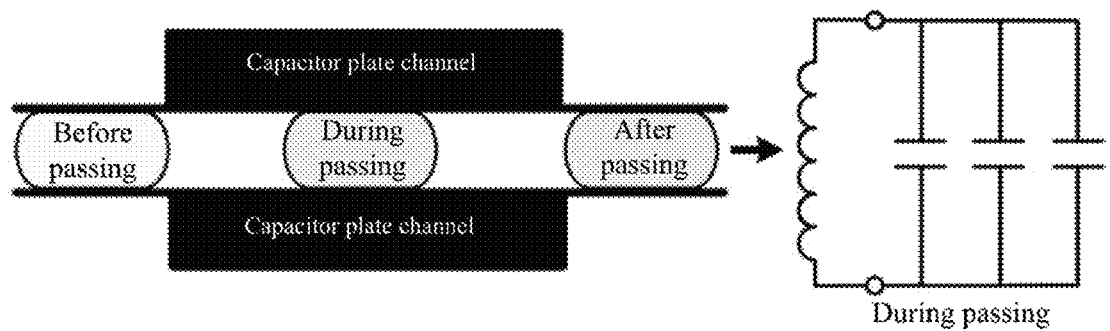
FIG. 7 is a schematic diagram of a droplet passing between a capacitor channel in an embodiment of the present invention.

Referring to FIG. 7, FIG. 7 is a schematic diagram of a droplet passing between a capacitor channel in an embodiment of the present invention.

In the embodiment of the present invention, the reading device 40 calculates the volume of the first droplet group (for the first liquid and the second liquid therein) or the second droplet group by using the following formula when the first droplet group or the second droplet group contacts the inner wall of the detection channel 10:

$$\Delta f_s = K_1 \cdot K_2 \cdot V_{droplet},$$

where $\Delta f_s$ denotes a variation value (known) of the first resonant frequency or the second resonant frequency;

$$K_1 = \frac{L_s}{4\pi(L_s C_s)^{\frac{3}{2}}},$$

where $L_s$ is an inductance value (known) of the primary inductor channel 80 or the secondary inductor channel 90 and $C_s$ is a capacitance value (known) of the primary capacitor channel 20 or the secondary capacitor channel 30; and $$K_2 = A \cdot \frac{\varepsilon_0(\varepsilon_1 - \varepsilon_2)}{D \cdot V_{capacitor}},$$

where A and D respectively denote a facing area (known) and a distance (known) between the primary capacitor channel 20 or between the secondary capacitor channel 30; $V_{capacitor}$ denotes a volume (known) contained between the primary capacitor channel 20 or between the secondary capacitor channel 30; $\varepsilon_1$ and $\varepsilon_2$ respectively denote a relative permittivity (known) of the first droplet group between the primary capacitor channel 20 or the second droplet group between the secondary capacitor channel 30, and a relative permittivity (known) of a substance (for example, a filling liquid in the detection channel 10) other than the droplet; and $\varepsilon_0$ denotes the vacuum permittivity (which is known, and $\varepsilon_0 = 8.85 \times 10^{-12}$ (F/m)).

In a specific implementation, the information of the first droplet group may be calculated by using the foregoing formula when the first droplet group contacts the inner wall of the detection channel 10, and the information of the second droplet group may be calculated by using the foregoing formula when the second droplet group contacts the inner wall of the detection channel 10.

In a specific implementation, when the foregoing formula is used to calculate the information of the first droplet group, $\Delta f_s$ denotes the variation value of the first resonant frequency, $L_s$ is an inductance value of the primary inductor channel 80, $C_s$ is a capacitance value of the primary capacitor channel 20, A and D respectively denote a facing area and a distance between the primary capacitor channel 20, $V_{capacitor}$ denotes a volume contained between the primary capacitor channel 20, and $\varepsilon_1$ and $\varepsilon_2$ respectively denote a relative permittivity of the first droplet group between the primary capacitor channel 20 and a relative permittivity of a substance other than the droplets in the first droplet group. That is, the involved parameters are related to the primary capacitor channel 20 and the primary inductor channel 80. When the foregoing formula is used to calculate the information of the second droplet group, $\Delta f_s$ denotes the variation value of the second resonant frequency, $L_s$ is an inductance value of the secondary inductor channel 90, $C_s$ is a capacitance value of the secondary capacitor channel 30, A and D respectively denote a facing area and a distance between the secondary capacitor channel 30, $V_{capacitor}$ denotes a volume contained between the secondary capacitor channel 30, and $\varepsilon_1$ and $\varepsilon_2$ respectively denote a relative permittivity of the second droplet group between the secondary capacitor channel 30 and a relative permittivity of a substance other than the droplets in the second droplet group. That is, the involved parameters are related to the secondary capacitor channel 30 and the secondary inductor channel 90.

In the embodiment of the present invention, the reading device 40 calculates the length of the first droplet group (for the first liquid and the second liquid therein) or the second droplet group with reference to the size of the detection channel 10.

In a specific implementation, $$\Delta f_s = -\frac{1}{4\pi(L_s C_s)^{\frac{3}{2}}}(C_s \cdot \Delta L_s + L_s \cdot \Delta C_s),$$

where $\Delta L_s$ and $\Delta C_s$ respectively denote a changing inductance value and a changing capacitance value of the double-resonance circuit; and when the droplet passes through the capacitor channel, $\Delta L_s \approx 0$, to obtain $$\Delta f_s = -\frac{L_s}{4\pi(L_s C_s)^{\frac{3}{2}}} \cdot \Delta C_s.$$

Further, a differential expression formula of the changing capacitance value is as follows:

$$\Delta C_S = \frac{\varepsilon_0 \varepsilon_r}{D} \cdot \Delta A + A\frac{\varepsilon_0}{D} \cdot \Delta \varepsilon_r - A\frac{\varepsilon_0 \varepsilon_r}{D^2} \cdot \Delta D,$$

where $\Delta A$ and $\Delta D$ respectively denote a changing facing area and a changing distance (which may be both approximately equal to 0) between the capacitor channel, and $\varepsilon_r$ denotes a relative permittivity of a medium between the capacitor channel. The following result can be obtained:

$$\Delta C_S = A \frac{\varepsilon_0}{D} \cdot \Delta \varepsilon_r,$$

where $$\varepsilon_{r1} = \frac{V_{droplet}}{V_{capacitor}} \varepsilon_1 + \left(1 - \frac{V_{droplet}}{V_{capacitor}}\right) \varepsilon_2,$$

which denotes an equivalent relative permittivity of the medium between the capacitor channel when the droplet passes between the capacitor channel; and $$\Delta \varepsilon_r = \varepsilon_{r1} - \varepsilon_2 = \frac{V_{droplet}}{V_{capacitor}} (\varepsilon_1 - \varepsilon_2),$$

Therefore, based on the formula: $\Delta f_s = K_1 \cdot K_2 \cdot V_{droplet}$, the volume $V_{droplet}$ of the droplet (namely, each drop of the droplets) can be obtained.

In a specific implementation, when the droplet contacts the inner wall of the detection channel 10 and entirely occupies the inner diameter of the detection channel 10, namely, in a status shown in FIG. 7, the droplet may be regarded as a cylinder, cuboid, or cube. After the volume of the droplet is obtained, the length of the detection object, namely, the height of the cylindrical, cuboid, or cubic droplet, can be calculated with reference to the size (the inner diameter) of the detection channel 10.

In the embodiment of the present invention, the reading device 40 calculates the volume of the first droplet group (for the first liquid and the second liquid therein) or the second droplet group by using the following formula when the first droplet group or the second droplet group does not contact the inner wall of the detection channel 10:

$$\Delta f_s = K_1 \cdot \frac{4\pi \cdot (\varepsilon_1 - \varepsilon_2) \cdot \varepsilon_0 \varepsilon_2}{D \cdot \varepsilon_1} \cdot \frac{r^3}{3D + 4r\left(\frac{\varepsilon_2}{\varepsilon_1} - 1\right)}$$

where $\Delta f_s$ denotes a variation value (known) of the first resonant frequency or the second resonant frequency;

$$K_1 = \frac{L_s}{4\pi(L_s C_s)^{\frac{3}{2}}},$$

where $L_s$ is an inductance value (known) of the primary inductor channel 80 or the secondary inductor channel 90 and $C_s$ is a capacitance value (known) of the primary capacitor channel 20 or the secondary capacitor channel 30; and D denotes the distance (known) between the primary capacitor channel 20 or between the secondary capacitor channel 30; $\varepsilon_1$ and $\varepsilon_2$ respectively denote a relative permittivity (known) of the first droplet group between the primary capacitor channel 20 or the second droplet group between the secondary capacitor channel 30, and a relative permittivity (known) of a substance other than the droplet; $\varepsilon_0$ denotes the vacuum permittivity; r denotes the radius of the first droplet group or the second droplet group; 2r denotes the length of the first droplet group or the second droplet group, and $4/3 \cdot \pi r^3$ is the volume of the first droplet group or the second droplet group.

In a specific implementation, when the foregoing formula is used to calculate the information of the first droplet group, $\Delta f_s$ denotes the variation value of the first resonant frequency, $L_s$ is an inductance value of the primary inductor channel 80, $C_s$ is a capacitance value of the primary capacitor channel 20, D denotes the distance between the primary capacitor channel 20, $\varepsilon_1$ and $\varepsilon_2$ respectively denote a relative permittivity of the first droplet group between the primary capacitor channel 20 and a relative permittivity of a substance other than the droplets in the first droplet group, r denotes the radius of the first droplet group (for the first liquid and the second liquid therein), 2r denotes the length of the first droplet group (for the first liquid and the second liquid therein), and $4/3 \cdot \pi r^3$ is the volume of the first droplet group (for the first liquid and the second liquid therein). That is, the involved parameters are related to the primary capacitor channel 20 and the primary inductor channel 80. When the foregoing formula is used to calculate the information of the second droplet group, $\Delta f_s$ denotes the variation value of the second resonant frequency, $L_s$ is an inductance value of the secondary inductor channel 90, $C_s$ is a capacitance value of the secondary capacitor channel 30, D denotes the distance between the secondary capacitor channel 30, $\varepsilon_1$ and $\varepsilon_2$ respectively denote a relative permittivity of the second droplet group between the secondary capacitor channel 30 and a relative permittivity of a substance other than the droplets in the second droplet group, r denotes the radius of the second droplet group, 2r denotes the length of the second droplet group, and $4/3 \cdot \pi r^3$ is the volume of the second droplet group. That is, the involved parameters are related to the secondary capacitor channel 30 and the secondary inductor channel 90.

Figure 8:
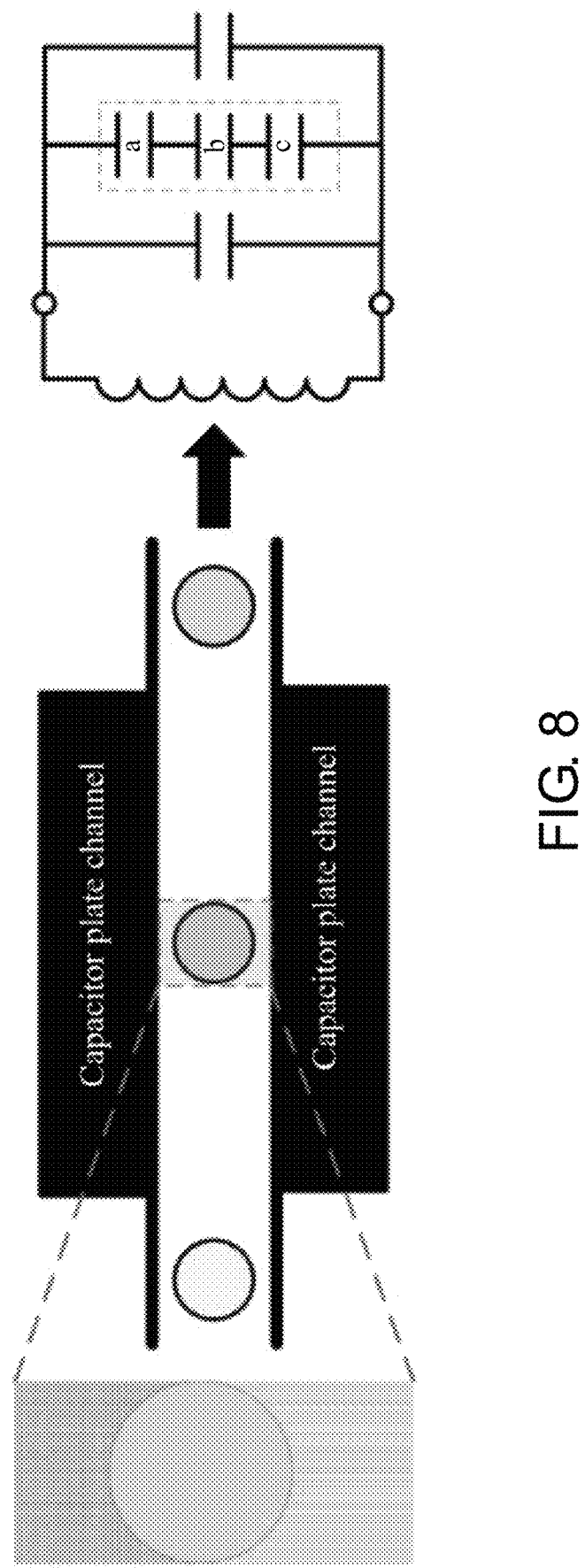
FIG. 8 shows another schematic diagram of a droplet passing between a capacitor channel, and a circuit equivalent diagram in an embodiment of the present invention.
Figure 9:
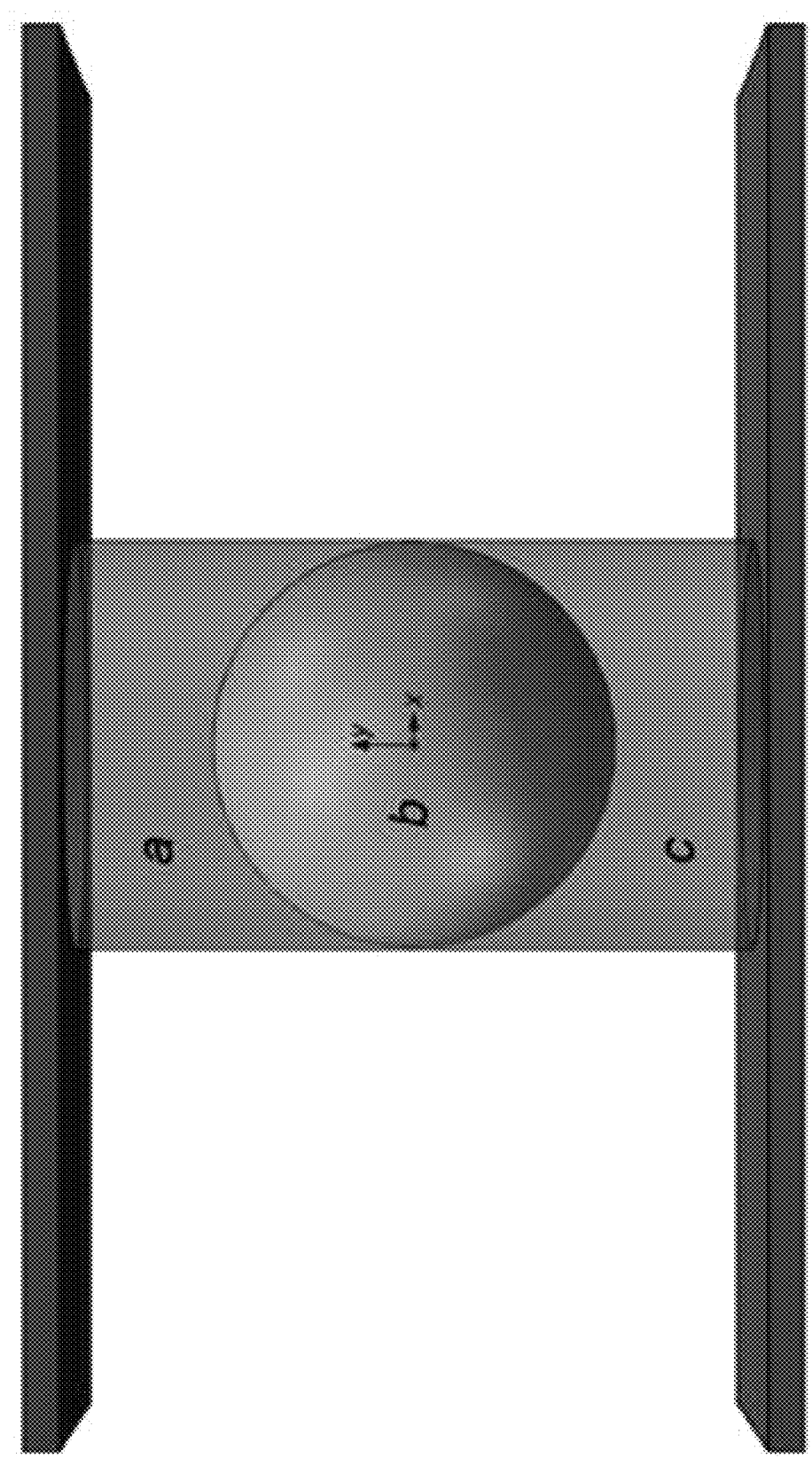
FIG. 9 is a schematic diagram of a droplet corresponding to FIG. 8.

Referring to FIG. 8 and FIG. 9, FIG. 8 is another schematic diagram of the droplet passing between the capacitor channel in an embodiment of the present invention; and FIG. 9 is a schematic diagram of a droplet corresponding to FIG. 8.

In a specific implementation, when the generated droplet is relatively small, the detection object does not contact the inner wall of the detection channel 10 when passing between the capacitor channel, as shown in FIGS. 8 and 9. A study model is simplified to a cylindrical medium region (having a volume of $V_1 = A_1 D = \pi r^2 D$) having a cross section $A_1 = \pi r^2$ (r is the radius of the approximately spherical droplet) of the droplet that directly faces the capacitor plates of the capacitor channel and a height equal to the distance D between the capacitor channel, as shown in FIG. 9; and the capacitance value changes only within the cylindrical medium region.

When the droplet has not passed between the capacitor channel, the medium (the filling liquid in the detection channel 10) in the study model is completely in a continuous phase and has a relative permittivity of $\varepsilon_2$. $\varepsilon_0 = 8.85 \cdot 10^{-12}$ (F/m), which is the vacuum permittivity. In this case, a combined capacitance in the medium area of the study model is:

$$C_2^* = \frac{\varepsilon_0 \varepsilon_2 A_1}{D}$$

When the droplet passes between the capacitor channel, in addition to the continuous-phase medium, the medium in the study model also contains approximately spherical droplets in a dispersed phase. In this case, a combined capacitance in the medium area of the study model is:

$$C_2 = \frac{1}{\frac{1}{C_a} + \frac{1}{C_b} + \frac{1}{C_c}}$$

As shown in FIG. 8, $C_a$, $C_b$, and $C_c$ are respectively a capacitance value of a medium area formed at one side of the droplet area, a capacitance value of a medium area formed by the droplet area, and a capacitance value of a medium area formed at the other side of the droplet area.

The capacitances are calculated separately by means of a differential method:

Calculation of $C_a$: The medium area corresponding to this capacitance value is equidistantly differentiated into several parts in x, y and z directions, and capacitors with the same facing area $A_k$ and the same distance $d_k$ in y direction are connected in series. A sum of the capacitances thereof is:

$$C_{ak} = \frac{1}{\sum \frac{1}{\frac{\varepsilon_0 \varepsilon_2 A_k}{d_k}}} = \frac{\varepsilon_0 \varepsilon_2 A_k}{\sum d_k}$$

In adjacent medium areas on the same xoz plane, capacitors are connected in parallel and a sum of the capacitances thereof may be calculated as follows:

$$C_a = \sum_{xoz} C_{ak} = \frac{\varepsilon_0 \varepsilon_2 A_1}{d_a} = \frac{D \cdot A_1}{d_a \cdot A_1} \cdot C_2^* = \frac{V_1}{V_a} \cdot C_2^*$$

where $V_a = \Sigma A_k d_i = d_a \cdot A_1$, and $C_b = \frac{V_1}{V_{droplet}} \cdot \frac{\varepsilon_1}{\varepsilon_2} \cdot C_2^*$, $C_c = \frac{V_1}{V_c} \cdot C_2^*$ can be obtained in the same way; and further, $V_1 = A_1 D = \pi r^2 D = V_a + V_{droplet} + V_c = V_a + 4/3 \cdot \pi r^3 + V_c$.

Then:

$$\Delta C_S = \Delta C_2 = C_2 - C_2^* =$$

$$\left( \frac{V_1}{V_a + \frac{\varepsilon_2}{\varepsilon_1} \cdot V_{droplet} + V_c} - 1 \right) C_2^* = \left( \frac{1}{1 + \frac{4 \cdot (\varepsilon_2 - \varepsilon_1) \cdot r}{3 \cdot \varepsilon_1 \cdot D}} - 1 \right) \cdot \frac{\varepsilon_0 \varepsilon_2 \pi r^2}{D} =$$

$$\frac{4\pi \cdot (\varepsilon_1 - \varepsilon_2) \cdot \varepsilon_0 \varepsilon_2}{D \cdot \varepsilon_1} \cdot \frac{r^3}{3D + 4r \left( \frac{\varepsilon_2}{\varepsilon_1} - 1 \right)}$$

(By taking the two phases of oil and water as an example: water as the dispersed phase and oil as the continuous phase, then:

$$\frac{\varepsilon_2}{\varepsilon_1} \approx 0).$$

Finally:

$$\Delta f_s = K_1 \cdot \frac{4\pi \cdot (\varepsilon_1 - \varepsilon_2) \cdot \varepsilon_0 \varepsilon_2}{D \cdot \varepsilon_1} \cdot \frac{r^3}{3D + 4r \left( \frac{\varepsilon_2}{\varepsilon_1} - 1 \right)}$$

A relationship between the variation value of the resonant frequency and the radius r of the spherical droplet is obtained; and then the length 2r and the volume $4/3 \cdot \pi r^3$ of the droplet can be obtained after calculation.

In the embodiment of the present invention, the reading device 40 calculates the speed $S_{droplet}$ of the first droplet group or the second droplet group by using the following formula:

$$S_{droplet} = \frac{L_{capacitor} + l_{droplet}}{\Delta t},$$

where $L_{capacitor}$ denotes the length of the primary capacitor channel 20 or the secondary capacitor channel 30, $l_{droplet}$ denotes the length of the first droplet group or the second droplet group, and $\Delta t$ denotes the time for which the first droplet group passes between the primary capacitor channel 20 or the second droplet group passes between the secondary capacitor channel 30.

In a specific implementation, when calculation and detection are performed for the first droplet group (for the first liquid or the second liquid therein), Lcapacitor denotes the length of the primary capacitor channel 20, ldroplet denotes the length of the first droplet group, and $\Delta t$ denotes the time for which the first droplet group passes between the primary capacitor channel 20. When calculation and detection are performed for the second droplet group, Lcapacitor denotes the length of the secondary capacitor channel 30, ldroplet denotes the length of the second droplet group, and $\Delta t$ denotes the time for which the second droplet group passes between the secondary capacitor channel 30.

In the embodiment of the present invention, the reading device 40 calculates the number of the first droplet groups or the second droplet groups according to the number of changes in the first resonant frequency or the second resonant frequency.

In a specific implementation, each time the droplet passes between the capacitor plate channels, the capacitance value of the capacitor channel changes, and then the resonant frequency of the resonant circuit changes accordingly. Therefore, each time the resonant frequency has a change, it indicates that the droplet passes between the capacitor plate channels, and thus the number of changes in the resonant frequency indicates the number of the droplets. In some actual application scenarios, the number of the droplets may be calculated by multiplying the number of changes in the resonant frequency by a preset weighting coefficient. For example, if the resonant frequency changes twice, it indicates that the first droplet group composed of a drop of the first liquid and a drop of the second liquid passes once.

What is claimed is:
1. A passive wireless device for microfluidic detection of multi-level droplets, comprising: a detection channel, a first droplet generation structure, a second droplet generation structure, a primary capacitor channel, a secondary capacitor channel, a primary inductor channel, a secondary inductor channel, and a reading device, wherein, the first droplet generation structure is connected to the detection channel and used to generate a first droplet group;

the second droplet generation structure is connected to the detection channel, and used to embed the first droplet group to generate a second droplet group;

the primary inductor channel and the secondary inductor channel each comprise two layers of inductance coils, and the inductance coils of the primary inductor channel and the secondary inductor channel are alternately arranged in each layer;

the primary capacitor channel is connected to the primary inductor channel, the secondary capacitor channel is connected to the secondary inductor channel, and the primary inductor channel is connected to the secondary inductor channel; a liquid conductive material is injected into the primary capacitor channel, the primary inductor channel, the secondary capacitor channel, and the secondary inductor channel, to form a double-resonance circuit;

a first part of the detection channel is disposed between the primary capacitor channel, wherein when a first droplet group passes through the first part, the permittivity of the primary capacitor channel changes and consequently a capacitance value of the primary capacitor channel changes, resulting in a change in a first resonant frequency of the double-resonance circuit; and a second part of the detection channel is disposed between the secondary capacitor channel, wherein when a second droplet group passes through the second part, the permittivity of the secondary capacitor channel changes and consequently a capacitance value of the secondary capacitor channel changes, resulting in a change in a second resonant frequency of the double-resonance circuit; and the reading device is used to read the resonant frequency of the double-resonance circuit, and perform detection according to the resonant frequency to obtain information of the corresponding first droplet group and/or second droplet group.

2. The passive wireless device for microfluidic detection of multi-level droplets according to claim 1, further comprising a microfluidic chip substrate, wherein the detection channel, the first droplet generation structure, the second droplet generation structure, the primary capacitor channel, the secondary capacitor channel, the primary inductor channel, and the secondary inductor channel are formed by micro channels based on a polydimethylsiloxane material, and are integrated on the microfluidic chip substrate.

3. The passive wireless device for microfluidic detection of multi-level droplets according to claim 1, wherein the first droplet generation structure comprises a first fluid inlet, a second fluid inlet, and a third fluid inlet; a first liquid and a second liquid are injected through the first fluid inlet and the second fluid inlet respectively, and a continuous-phase liquid is injected through the third fluid inlet.

4. The passive wireless device for microfluidic detection of multi-level droplets according to claim 3, wherein the second droplet generation structure comprises a fourth fluid inlet through which an embedding liquid is injected to embed the first liquid and the second liquid, so as to form the second droplet group.

5. The passive wireless device for microfluidic detection of multi-level droplets according to claim 4, wherein the detection channel comprises a bent part which is disposed between the first part and the second part and is used to enable the first droplet group embedded in the second droplet group to blend.

6. The passive wireless device for microfluidic detection of multi-level droplets according to claim 1, wherein the reading device calculates the volume of the first droplet group or the second droplet group by using the following formula when the first droplet group or the second droplet group contacts the inner wall of the detection channel:

$$\Delta f_s = K_1 \cdot K_2 \cdot V_{droplet},$$

wherein $\Delta f_s$ denotes a variation value of the first resonant frequency or the second resonant frequency;

$$K_1 = \frac{L_S}{4\pi (L_S C_S)^{\frac{3}{2}}},$$

$L_s$ being an inductance value of the primary inductor channel or the secondary inductor channel and $C_s$ being a capacitance value of the primary capacitor channel or the secondary capacitor channel; and $$K_2 = A \cdot \frac{\varepsilon_0 (\varepsilon_1 - \varepsilon_2)}{D \cdot V_{capacitor}},$$

wherein A and D respectively denote a facing area and a distance between the primary capacitor channel or between the secondary capacitor channel; $V_{capacitor}$ denotes a volume contained between the primary capacitor channel or between the secondary capacitor channel; $\varepsilon_1$ and $\varepsilon_2$ respectively denote a relative permittivity of the first droplet group between the primary capacitor channel or the second droplet group between the secondary capacitor channel, and a relative permittivity of a substance other than the droplet; and $\varepsilon_0$ denotes the vacuum permittivity.

7. The passive wireless device for microfluidic detection of multi-level droplets according to claim 6, wherein the reading device calculates the length of the first droplet group or the second droplet group with reference to the size of the detection channel.

8. The passive wireless device for microfluidic detection of multi-level droplets according to claim 7, wherein the reading device calculates the speed $S_{droplet}$ of the first droplet group or the second droplet group by using the following formula:

$$S_{droplet} = \frac{L_{capacitor} + l_{droplet}}{\Delta t},$$

wherein $L_{capacitor}$ denotes the length of the primary capacitor channel or the secondary capacitor channel, $l_{droplet}$ denotes the length of the first droplet group or the second droplet group, and $\Delta t$ denotes the time for which the first droplet group passes between the primary capacitor channel or the second droplet group passes between the secondary capacitor channel.

9. The passive wireless device for microfluidic detection of multi-level droplets according to claim 1, wherein the reading device calculates the volume of the first droplet group or the second droplet group by using the following formula when the first droplet group or the second droplet group does not contact the inner wall of the detection channel:

$$\Delta f_s = K_1 \cdot \frac{4\pi \cdot (\varepsilon_1 - \varepsilon_2) \cdot \varepsilon_0 \varepsilon_2}{D \cdot \varepsilon_1} \cdot \frac{r^3}{3D + 4r\left(\frac{\varepsilon_2}{\varepsilon_1} - 1\right)},$$

wherein $\Delta f_s$ denotes a variation value of the first resonant frequency or the second resonant frequency;

$$K_1 = \frac{L_S}{4\pi(L_S C_S)^{\frac{3}{2}}} L_S$$

being an inductance value of the primary inductor channel or the secondary inductor channel and $C_s$ being a capacitance value of the primary capacitor channel or the secondary capacitor channel; and D denotes a distance between the primary capacitor channel or between the secondary capacitor channel; $\varepsilon_1$ and $\varepsilon_2$ respectively denote a relative permittivity of the first droplet group between the primary capacitor channel or the second droplet group between the secondary capacitor channel, and a relative permittivity of a substance other than the droplet; $\varepsilon_0$ denotes the vacuum permittivity; r denotes the radius of the first droplet group or the second droplet group; 2r denotes the length of the first droplet group or the second droplet group, and $4/3 \cdot \pi r^3$ is the volume of the first droplet group or the second droplet group.

10. The passive wireless device for microfluidic detection of multi-level droplets according to claim 9, wherein
the reading device calculates the speed $S_{droplet}$ of the first droplet group or the second droplet group by using the following formula:

$$S_{droplet} = \frac{L_{capacitor} + l_{droplet}}{\Delta t},$$

wherein $L_{capacitor}$ denotes the length of the primary capacitor channel or the secondary capacitor channel, $l_{droplet}$ denotes the length of the first droplet group or the second droplet group, and $\Delta t$ denotes the time for which the first droplet group passes between the primary capacitor channel or the second droplet group passes between the secondary capacitor channel.

11. The passive wireless device for microfluidic detection of multi-level droplets according to claim 1, wherein the reading device calculates the number of the first droplet groups or the second droplet groups according to the number of changes in the first resonant frequency or the second resonant frequency.

* * * * *